Jan. 19, 1960 W. H. EDMUNDS 2,922,007
SPRING MOUNTING OF CURRENT LIMITING DEVICES WITHIN A HOUSING
Filed Nov. 23, 1956 4 Sheets-Sheet 1
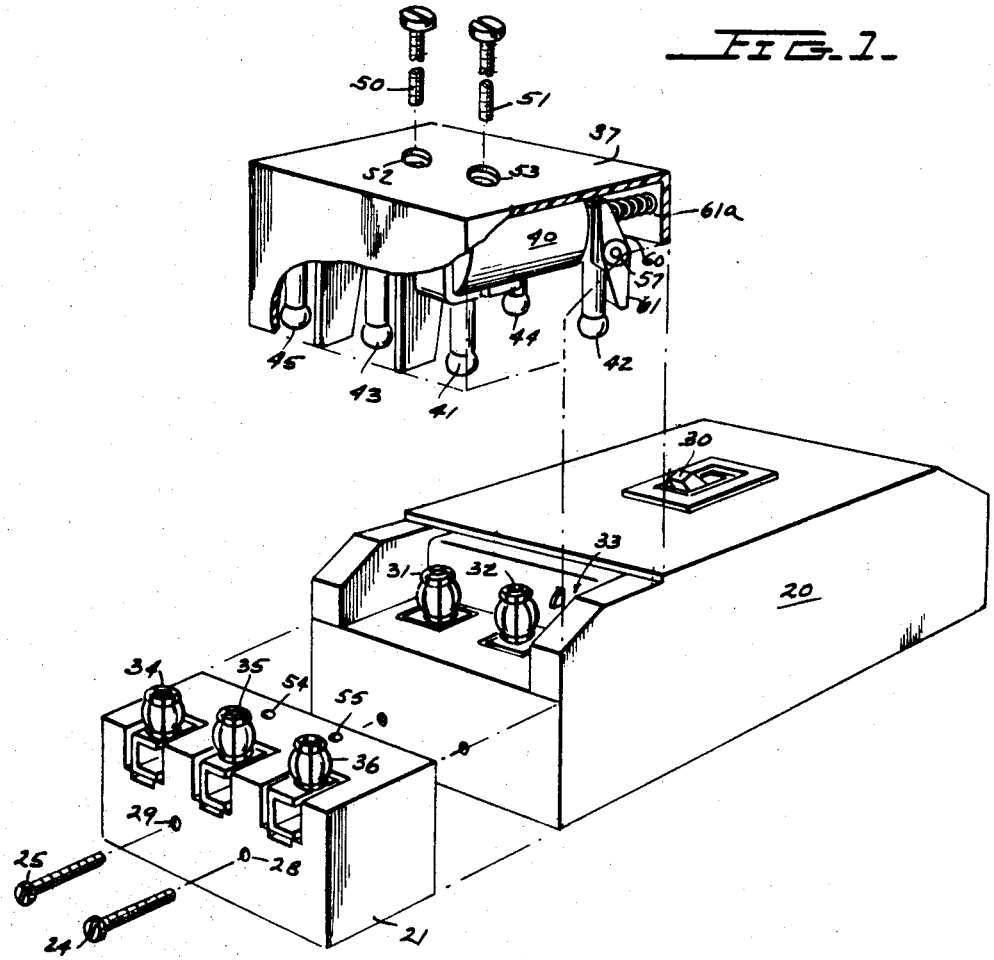
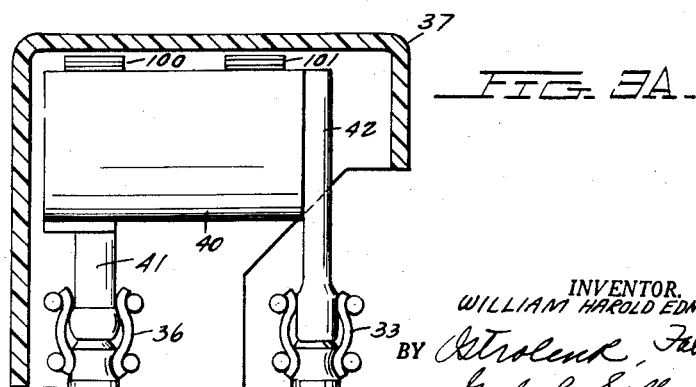
INVENTOR.
WILLIAM HAROLD EDMUNDS
ATTORNEYS

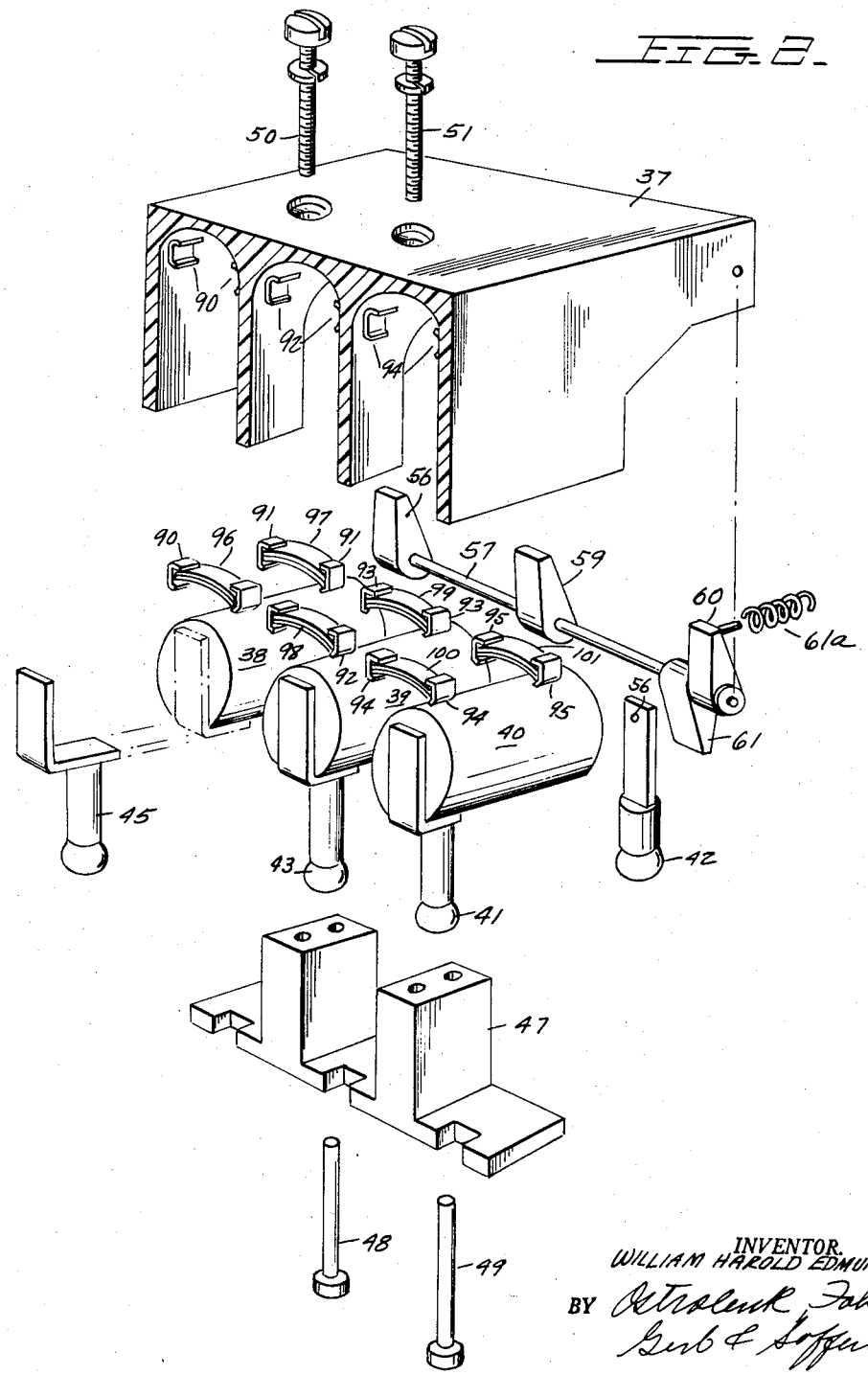

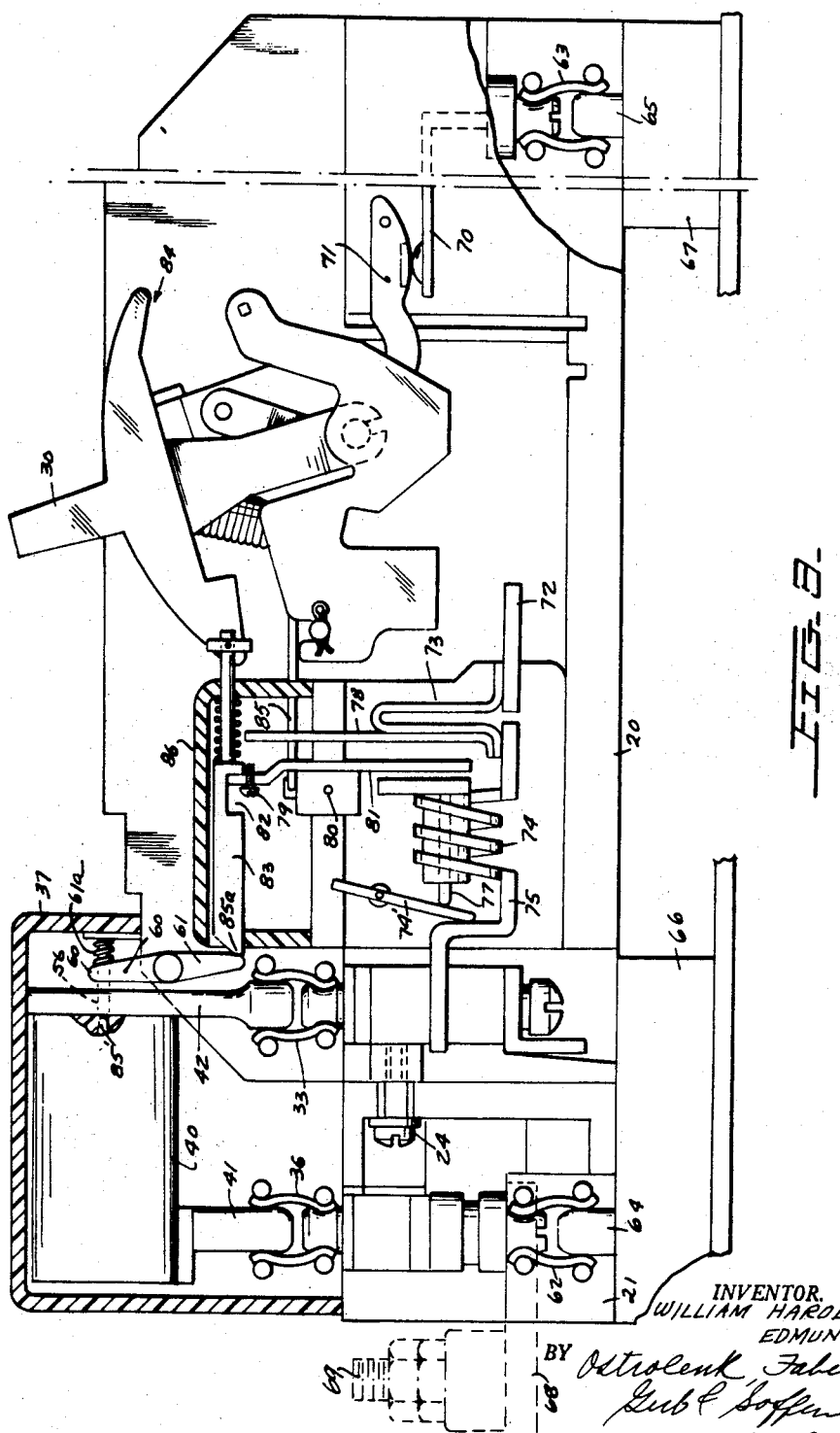

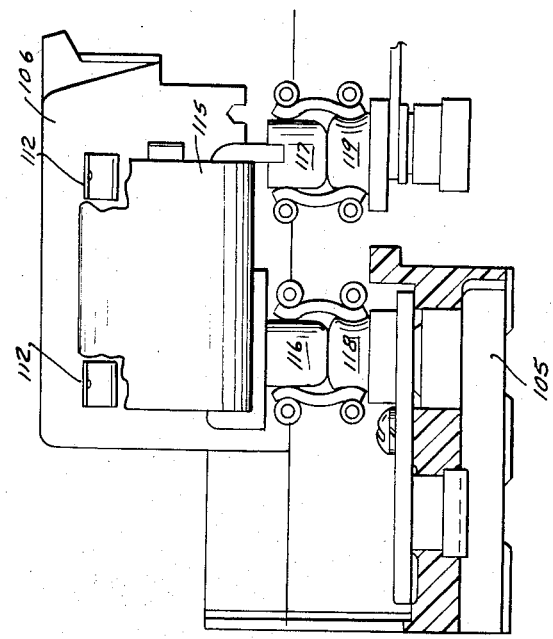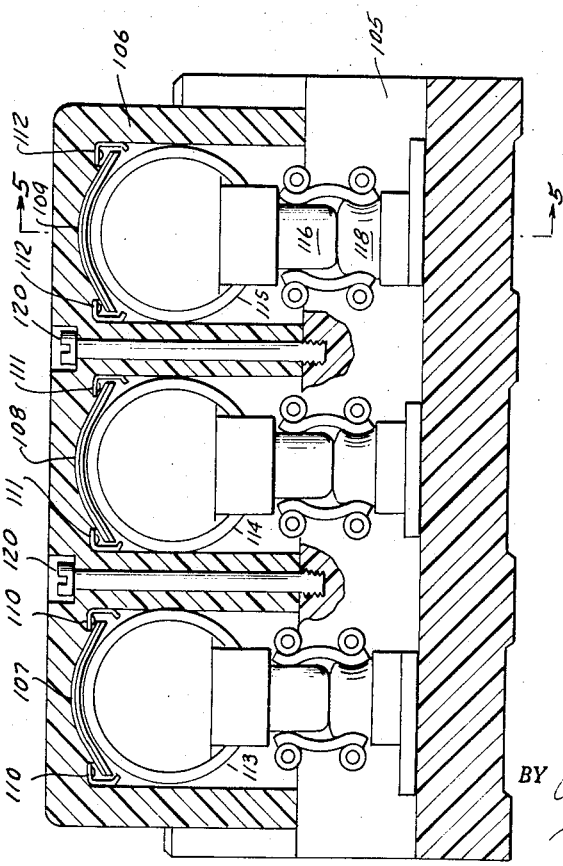

United States Patent Office 2,922,007
Patented Jan. 19, 1960

2,922,007

SPRING MOUNTING OF CURRENT LIMITING DEVICES WITHIN A HOUSING

William Harold Edmunds, Havertown, Pa., assignor to I-T-E Circuit Breaker Company, Philadelphia, Pa., a corporation of Pennsylvania Application November 23, 1956, Serial No. 623,882

9 Claims. (Cl. 200—116)

This invention relates to the housing construction of current limiting devices which are adapted with tulip clip type disconnect contacts for removable connection to a circuit breaker and is more specifically directed to a biasing means contained within a current limiter housing which places the stud of a tulip clip type contact into direct engagement with the current limiter stud to thereby achieve a low resistance terminal connection.

The combination of a series connected circuit breaker and current limiting device has been set forth in my copending application Serial No. 461,378, filed October 11, 1954 and a construction wherein the current limiters and circuit breaker are placed in individual housings which are removably connected to one another is set forth in copending applications Serial No. 472,929 filed December 3, 1954 and Serial No. 622,042 filed November 14, 1956.

In essence, this combination allows the use of a circuit breaker having a lower interrupting rating than the available short circuit capacity of the line wherein the circuit breaker is provided with thermal trip units for opening a circuit after prolonged overloads and an instantaneous trip unit for opening the circuit under relatively low fault values. When a heavy fault appears or a fault which exceeds a predetermined cross-over point, the series connected current limiting fuse operates to interrupt the circuit rather than the circuit breaker which may not be large enough to interrupt this fault value.

As well as being electrically coordinated as seen above, the two devices are also mechanically coordinated in that operation of the current limiting fuse of any phase (when operating in a multiphase system) will automatically trip the circuit breaker contacts of each phase.

When the current limiters and circuit breaker are assembled in individual housings, each current limiting device is provided with disconnect studs which cooperate with corresponding disconnect contacts of the tulip clip type as seen in copending application Serial No. 622,042 filed November 14, 1956 which are fastened to the circuit breaker housing and serve to place each current limiting device in series with a respective circuit breaker phase.

Since the interrupting rating of circuit breakers of different current ratings may be the same, the crossover point of the current limiting device associated with the circuit breaker must be the same for each circuit breaker as is described in copending application Serial No. 461,378. However, circuit breakers of the higher current ranges will have a greater heating at their terminals which are close to the thermal trip unit. Thus, in adjusting the thermal time delay units of the circuit breakers to account for this greater heating, the circuit breakers of the higher current ratings will take a longer time to trip on a prolonged overload, since their thermal time delay units are adjusted to accommodate the greater degree of heating at their terminals.

I have found that by providing a spring bias for the current limiting fuses of the current limiting housing to place the disconnect stud of the current limiter into contact engagement with the stud of the circuit breaker tulip clip disconnect, that the local heating at the terminals may be substantially reduced so as to allow consistent operation of the circuit breakers of different current ratings on thermal trip.

Thus, my noval biasing means forces the cooperating disconnect contact studs into contact engagement when the removable housing of the current interrupting device is tightened into position so that contact is achieved not only through the current carrying tulip clip springs, but is also achieved by bringing the disconnect studs into direct contact, thereby substantially reducing contact resistance and heating at the terminals.

Accordingly, a primary object of my invention is to construct a current limiting device housing so that the disconnect contacts of the current limiting fuses will be biased into intimate contact engagement with the cooperating disconnect contact stud of the circuit breaker tulip clip contacts associated with the current limiting device.

Another object of my invention is to provide biasing means for supporting current limiting fuses in a housing which will bring the disconnect stud of each current limiting fuse into direct contact with the disconnect stud of a cooperating circuit breaker disconnect contact.

These and other objects of my invention will become apparent from the following description when taken in connection with the drawings in which:

Figure 1 is a perspective view showing a circuit interrupting device comprising a circuit breaker contained within a first housing and a current limiting device contained within a second and removable housing.

Figure 2 is an exposed perspective view of the current limiting device and housing of Figure 1 when constructed in accordance with my novel invention.

Figure 3 is a cross-sectional view through one phase of Figure 1.

Figure 3A shows a portion of Figure 3 when the biasing means of my novel invention is used in the fuse housing.

Figure 4 shows a front-cross-sectional view of my novel invention in conjunction with a different type of cooperating circuit breaker base than that shown in Figure 3.

Figure 5 is a side-cross-sectional view of Figure 4 taken along the lines 5—5 of Figure 4.

Referring first to Figure 1, a circuit breaker housing 20 has an extension 21 connectible to one end thereof by means of screws such as screws 24 and 25 which pass through openings 28 and 29 respectively, which fasten into cooperating openings in circuit breaker housing 20.

If desired, extension 21 could be an integral part of the circuit breaker base as is shown in my above mentioned copending application Serial No. 622,042 filed November 14, 1956.

Contained within circuit breaker housing 20 is an operating mechanism of any desired type such as that shown in my U.S. Patent No. 2,574,093 issued November 13, 1951 entitled "Adjustable Trip" and assigned to the assignee of the instant invention, which is operable by operating handle 30 for operating a pair of contacts for each phase of the circuit breaker. Each of the pairs of contacts of each phase is then terminated on one side by disconnect contacts 31, 32 and a contact 33, which cannot be seen in Figure 1 respectively.

The extension 21 provides additional disconnect contacts 34, 35 and 36 which cooperate with contacts 31, 32 and 33 respectively for connecting a current limiting device in series with each of the circuit breaker phases.

Each of disconnect contacts 31 through 36 are of the tulip clip type such as that described in copending application Serial No. 536,586, filed September 26, 1955 and assigned to the assignee of the instant invention, which are constructed to receive a stud in electrical and mechanical engagement.

Current limiting devices for cooperating with each of the circuit breaker phases are housed within housing 37. Figure 2 more specifically shows these current limiting devices as fuses 40, 39 and 38 which are provided with disconnect studs 41, 42, 43, 44, and 45 and a stud (not shown) similar to 44 respectively. As seen in Figure 1, fuse 40 is connected to its corresponding phase by connection of disconnects 41 and 42, and disconnects 36 and 33 respectively. In a similar manner, disconnects 43, 44 and 45, 46 of Figure 2 will cooperate with disconnects 35, 32 and 34, 31 respectively of Figure 1.

Fuses 38, 39 and 40 are maintained in housing 37 by retaining plate 47 which is fastened to housing 37 by screws 48 and 49 as seen in Figure 2 and described in copending application Serial No. 582,552 filed May 3, 1956, and the assembled housing is connected to the circuit breaker housing by screws 50 and 51 which pass through apertures 52 and 53 respectively and into tapped openings 54 and 55 of extension 21 as seen in Figure 1.

As may be seen in the copending application Serial No. 472,969 filed December 3, 1954 entitled "Removable and Replaceable Current Limiting Housing for Circuit Breakers" to W. H. Edmunds and assigned to the assignee of the instant application, each of fuses 38, 39 and 40 are provided with a striker pin such as striker pin 85 of fuse 40 which is ejected from the fuse upon operation thereof. The striker pins are positioned to pass through a cooperating aperture in its respective disconnect, such as aperture 56 of disconnect 42 which cooperates with striker pin 85.

An auxiliary tripper bar 57 is pivotally mounted within housing 37 as seen in Figures 1 and 2 and as best seen in Figure 2, tripper bar 57 has extensions 58, 59 and 60 thereon which are positioned to be engaged by the striker pins of fuses 38, 39 and 40 respectively upon operation thereof.

A further extension 61 is fastened to auxiliary tripper bar 57 which, as will be seen hereinafter, is biased into operative engagement with the tripper bar of the circuit breaker by biasing spring 61a.

Figure 3 shows a cross sectional view of the assembled components of Figure 1 when taken through the phase including fuse 40.

As seen in Figure 3 which shows screw 24 fastened to circuit breaker housing 20, a tulip clip type contact 62 is electrically connected to contact 36 and is fastened within housing 21 in any desired manner. Clearly, a set of disconnects similar to disconnect 62 will be provided for each of disconnects 34 and 35.

The circuit breaker 20 is provided with a similar set of disconnects such as disconnect contact 63 wherein disconnects 62 and 63 cooperate for plug in engagement with studs 64 and 65 respectively of mounting blocks 66 and 67 which may be fastened within a switch board. Clearly, each of the other phases will be provided with similar sets of disconnects for cooperating with corresponding mounting blocks.

As an alternative, Figure 3 shows that a straight terminal 68 could be brought out as seen in dotted lines where connection to the current interrupting device is made at lead connecting means 69.

The current path of the phase shown in Figure 3 includes stud 65, circuit breaker tulip clip 63, stationary contact 70, movable contact of contact arm 71, a pigtail (not shown) which connects contact arm 71 to conductor 72, heater 73, coil 74, conductor 75, tulip clip 33, stud 42, fuse 40, stud 41, tulip clip 36, tulip clip 62, and stud 64.

Coil 74 has a pivotally mounted armature 74' and a plunger 77 associated therewith, these components comprising the magnetic trip unit. Heater 73 has bimetal 78 and adjusting screw 79 associated therewith, these components comprising the thermal-trip unit.

A tripper bar 80 is then seen in Figure 3 as having member 81 fastened thereto which carries adjusting screw 79 in cooperating alignment with bimetal 78 and is itself aligned with plunger 77.

Member 81 has one end thereof protruding into slot 82 of trip rod 83 and is rotatable in a counterclockwise direction within slot 82.

The operating mechanism 84 has a latch member 85 connected thereto and constructed to be latched by tripper bar 80. When tripper bar 80 is rotated in a counterclockwise direction, however, latch member 85 will be unlatched to allow mechanism 84 to disengage the circuit breaker cooperating contacts of each phase since mechanism 84 is constructed to be common to each phase.

In the event of a prolonged overload, heater 73 will cause bimetal 78 to deflect into engagement with screw 79 to cause counterclockwise rotation of tripper bar 80 and tripping of the circuit breaker contacts.

Under fault conditions, coil 74 will create a strong magnetic field to cause armature 76 to drive plunger 77 into engagement with member 81, thus rotating bar 80 counterclockwise to effect instantaneous tripping of the circuit breaker contacts.

Figure 3 further shows the striker pin 85' of fuse 40 as being positioned in registry with aperture 56 in disconnect 42 and extension 60 of auxiliary tripper bar 57 (see Figure 2).

When fuse 40 is operated (on faults above a predetermined value), striker pin 85' is ejected into engagement with extension 60 to rotate auxiliary tripper bar 57 (Figure 2) clockwise against the biasing force of spring 61a. This rotation will then remove extension 61 from tip 85a of trip rod 83 and allow biasing spring 86 to drive trip rod 83 to the left and rotate tripper bar 80 counterclockwise for tripping the circuit breaker contacts.

Thus, upon operation of one of the current limiting fuses such as fuse 40, the circuit breaker contacts will be disengaged to prevent single phasing and to disconnect the circuit.

It is important to note that the same action would be obtained if the fuse housing 37 were disconnected from the circuit breaker housing 20. That is, extension 61 of tripper bar 57 would be removed from tip 85a of link 83 to allow subsequent rotation of tripper bar 80.

Hence, in my novel construction wherein the fuse housing 37 is connected at the end of circuit breaker housing 20, the circuit breaker cooperating contacts will be disengaged responsive either to operation of any of the fuses or to removal of the fuse housing.

Figure 2 specifically shows the manner in which the fuse assembly could be adapted in accordance with my novel invention so as to place the current carrying studs of the disconnects into direct contact engagement. That is, in the embodiment of Figure 3, which shows prior art structure, it is seen that current carrying connection between the cooperating disconnects normally occurs only at the current carrying spring while my novel biasing means will force the current carrying studs into engagement.

As seen in Figure 2, bracket sets 90, 91, 92, 93, 94 and 95 support leaf springs 96, 97, 98, 99, 100 and 101 respectively, the brackets being supported from housing 20 in any desired manner. Leaf springs 96, 97, 98, 99, and 100, 101 are associated with fuses 38, 39 and 40 respectively.

When the fuse housing is connected to the circuit breaker housing, the fuse disconnects will be strongly biased to the engaged position by their corresponding leaf springs to thereby place the studs of the circuit breaker disconnects in direct engagement with the studs of the current limiters.

Hence, a current connection will be formed from stud to stud by means of the contact fingers as well as by the direct stud engagement. In view of this more effective current carrying contact, less heat will be dissipated at the contact area and thermal calibration for various current ratings will yield more uniform results.

Figure 3a shows how the device of Figure 3 is connected when constructed in accordance with my invention wherein the fuse 40 is seen to be biased into disconnect contact engagement. Clearly, the direct stud engagement between disconnects 33 and 42 of Figure 3a will produce less contact heating which would upset the calibration of bimetal 78 and adjusting screw 79 (see Figure 3).

Figures 4 and 5 show a second embodiment of my novel invention wherein the circuit breaker base 105 is extended and carries a plurality of disconnect contacts of the tulip clip type for cooperating with the studs of the current limiting device.

More specifically, current limiting device housing 106 has leaf springs 107, 108 and 109 supported therein in any desired manner as by the brackets 110, 111 and 112 respectively. The leaf spring 107 is then seen as being associated with a current limiting fuse 113, leaf spring 108 is associated with current limiting fuse 114 while the leaf spring 104 is associated with current limiting fuse 115 in a manner similar to that described in Figures 1 and 2.

As is more clearly seen in Figure 5, these leaf springs are provided at each end of their respective current limiting fuses and serve to place studs such as 116 and 117 of their respective fuses in direct contact with associated studs such as studs 118 and 119 of the circuit breaker base. Hence further points of current carrying contact areas are provided at the point of contact between studs 116 and 117, and 118 and 119 respectively.

Figure 5 further shows the position of springs 109 in the absence of the fuse 115 or when fuse housing 106 is disconnected. Clearly, when a fuse is inserted as is seen in Figure 4 and connection is made to a circuit breaker housing, a strong downward bias action is achieved, when a mounting screw such as mounting screw 120 is tightened to fasten the current limiting device housing 25 to the circuit breaker base 105.

Although I have here described preferred embodiments of my novel invention, many variations and modifications will now be obvious to those skilled in the art. I prefer therefore to be limited not by the specific disclosure herein, but only by the appended claims.

I claim:

1. A current interrupting device comprising a current limiting means mounted within a first housing and a circuit breaker mounted within a second housing; said current limiting means having a first and second disconnect contact stud associated therewith, said circuit breaker having a disconnect contact of the tulip clip type removably engaged with said first current limiting means disconnect contact stud; said extended portion carrying a disconnect contact of the tulip clip type for cooperating with said second current limiting means disconnect contact stud; said circuit breaker having automatic trip means associated therewith for automatically operating said circuit breaker in mechanical coordination with said current limiting means; said current limiting means and said circuit breaker being connected in series when said first and second disconnect contacts are connected to their said cooperating contacts; biasing means supported within said first housing; said biasing means being constructed to bias said first and second disconnect contact studs into direct engagement with the studs of said disconnect contacts of the tulip clip type cooperating with said first and second disconnect contact studs when said current limiting means and said circuit breaker are connected in series.

2. A current interrupting device comprising a current limiting means mounted within a first housing and a circuit breaker mounted within a second housing; said current limiting means having a first and second disconnect contact stud associated therewith, said circuit breaker having a disconnect contact of the tulip clip type removably engaged with said first current limiting means disconnect contact stud; said extended portion carrying a disconnect contact of the tulip clip type for cooperating with said second current limiting means disconnect contact stud; said circuit breaker having automatic trip means associated therewith for automatically operating said circuit breaker in mechanical coordination with said current limiting means; said current limiting means and said circuit breaker being connected in series when said first and second disconnect contacts are connected to their said cooperating contacts; biasing means comprising a leaf spring supported within said first housing; said biasing means being constructed to bias said first and second disconnect contact studs into direct engagement with the studs of said disconnect contacts of the tulip clip type cooperating with said first and second disconnect contact studs when said current limiting means and said circuit breaker are connected in series; the biasing force of said leaf spring being increased when said current limiting means first housing is secured to said circuit breaker second housing.

3. A current interrupting device comprising a current limiting means mounted within a first housing and a circuit breaker mounted within a second housing; said current limiting means having a first and a second disconnect contact stud associated therewith, said circuit breaker having a first and a second disconnect contact of the tulip clip type removably engaged with said first and second current limiting means disconnect contact stud respectively; said circuit breaker being operable responsive to prolonged overloads and relatively low fault conditions; said current limiting means being operable responsive to relatively high faults; said circuit breaker having automatic trip means associated therewith for automatically operating said circuit breaker in mechanical coordination with said current limiting means; said current limiting means and said circuit breaker being connected in series when said first and second disconnect contacts are connected to their said cooperating contacts; biasing means supported within said first housing; said biasing means being constructed to bias said first and second disconnect contact studs into direct engagement with the studs of said disconnect contacts of the tulip clip type cooperating with said first and second disconnect contact studs when said current limiting means and said circuit breaker are connected in series.

4. A current interrupting device comprising a current limiting means mounted within a first housing and a circuit breaker mounted within a second housing; said current limiting means having a first and second disconnect contact stud associated therewith, said circuit breaker having a first and second disconnect contact of the tulip clip type removably engaged with said first and second current limiting means disconnect contact stud respectively; said circuit breaker being operable responsive to prolonged overloads and relatively low fault conditions; said current limiting means being operable responsive to relatively high faults; said circuit breaker having automatic trip means associated therewith for automatically operating said circuit breaker in mechanical coordination with said current limiting means; said current limiting means and said circuit breaker being connected in series when said first and second disconnect contacts are connected to their said cooperating contacts; biasing means comprising a leaf spring supported within said first housing; said biasing means being constructed to bias said first and second disconnect contact studs into direct engagement with the studs of said disconnect contacts of the tulip clip type cooperating with said first and second disconnect contact studs when said current limiting means and said circuit breaker are connected in series; the biasing force of said leaf spring being increased when said current limiting means first housing is secured to said circuit breaker second housing.

5. A current interrupting device comprising a current limiting means mounted within a first housing and a circuit breaker mounted within a second housing; said current limiting means having a first and second disconnect contact stud associated therewith, said circuit breaker having a disconnect contact of the tulip clip type removably engaged with said first current limiting means disconnect contact stud; said circuit breaker having an extended base at one end thereof; said extended portion carrying a disconnect contact of the tulip clip type for cooperating with said second current limiting means disconnect contact stud; said circuit breaker having automatic trip means associated therewith for automatically operating said circuit breaker in mechanical coordination with said current limiting means; said current limiting means and said circuit breaker being connected in series when said first and second disconnect contacts are connected to their said cooperating contacts; biasing means comprising a leaf spring supported within said first housing; said biasing means being operatively connected to said current limiting means and being positioned to bias said first and second disconnect contact studs into direct engagement with the studs of said disconnect contacts of the tulip clip type cooperating with said first and second disconnect contact studs when said current limiting means and said circuit breaker are connected in series; the biasing force of said leaf spring being increased when said current limiting means first housing is secured to said circuit breaker second housing.

6. A current interrupting device comprising a current limiting means mounted within a first housing and a circuit breaker mounted within a second housing; said current limiting means having a first and second disconnect contact stud associated therewith, said circuit breaker having a first and second disconnect contact of the tulip clip type removably engaged with said first and second current limiting means disconnect contact stud respectively; said circuit breaker having automatic trip means associated therewith for automatically operating said circuit breaker in mechanical coordination with said current limiting means; said current limiting means and said circuit breaker being connected in series when said first and second disconnect contacts are connected to their said cooperating contacts; biasing means supported within said first housing; said biasing means being operatively connected to said current limiting means to bias said first and second disconnect contact studs into direct engagement with the studs of said disconnect contacts of the tulip clip type cooperating with said first and second disconnect contact studs when said current limiting means and said circuit breaker are connected in series.

7. A current interrupting device comprising a plurality of current limiting fuses mounted within a first housing and a multiphase circuit breaker mounted within a second housing; each of said current limiting fuses having a first and second disconnect contact stud associated therewith, each phase of said multiphase circuit breaker having a disconnect contact of the tulip clip type removably engaged with said first disconnect contact stud of one of said plurality of current limiting fuses; said circuit breaker having an extended base at one end thereof; said extended portion carrying a disconnect contact of the tulip clip type for each phase for cooperating with said second disconnect contact stud of one of said plurality of current limiting fuses; said circuit breaker having automatic trip means associated therewith for automatically operating each phase of said circuit breaker in mechanical coordination with any one of said plurality of current limiting fuses; each of said plurality of current limiting fuses being connected in series with a corresponding phase of said multiphase circuit breaker when said first and second disconnect contacts are connected to their said cooperating contacts; biasing means supported within said first housing; said biasing means being constructed to bias said first and second disconnect contact studs of each of said current limiting fuses into direct engagement with the cooperating studs of said disconnect contacts of the tulip clip type cooperating with said first and second disconnect contacts studs.

8. A current interrupting device comprising a plurality of fuses mounted within a first housing and a multiphase circuit breaker mounted within a second housing; each of said fuses having a first and second disconnect contact stud associated therewith, each phase of said multiphase circuit breaker having a disconnect contact of the tulip clip type removably engaged with said first disconnect contact stud of one of said plurality of fuses; said circuit breaker having an extended base at one end thereof; said extended portion carrying a disconnect contact of the tulip clip type for each phase for cooperating with said second disconnect contact stud of one of said plurality of fuses; said circuit breaker having automatic trip means associated therewith for automatically operating each phase of said circuit breaker in mechanical coordination with any one of said plurality of fuses; each of said plurality of fuses being connected in series with a corresponding phase of said multiphase circuit breaker when said first and second disconnect contacts are connected to their said cooperating contacts; biasing means comprising a leaf spring supported within said first housing; said biasing means being constructed to bias said first and second disconnect contact studs of each of said fuses into direct engagement with the cooperating studs of said disconnect contacts of the tulip clip type cooperating with said first and second disconnect contact studs; the biasing force of said leaf spring being increased when said first housing is secured to said circuit breaker second housing.

9. A current interrupting device comprising a fuse means mounted within a first housing and a circuit breaker mounted within a second housing; said fuse means having a first and second disconnect contact stud associated therewith, said circuit breaker having a first and second disconnect contact of the tulip clip type removably engaged with said first and second fuse means disconnect contact stud respectively; said circuit breaker having automatic trip means associated therewith for automatically operating said circuit breaker in mechanical coordination with said fuse means; said fuse means and said circuit breaker being connected in series when said first and second disconnect contacts are connected to their said cooperating contacts; biasing means supported within said first housing; said biasing means being operatively connected to said fuse means to bias said first and second disconnect contact studs into direct engagement with the studs of said disconnect contacts of the tulip clip type cooperating with said first and second disconnect contact studs when said fuse means and said circuit breaker are connected in series; said fuse means also including an insulating casing; said biasing means being in direct contact with said casing.

References Cited in the file of this patent

UNITED STATES PATENTS

| | | |
|---|---|---|
| 974,109 | Auel et al. | Nov. 1, 1910 |
| 1,232,412 | Van Valkenburg | July 3, 1917 |
| 1,556,829 | Wyman | Oct. 13, 1925 |
| 1,686,289 | Milano | Oct. 2, 1928 |
| 1,700,757 | Benjamin | Feb. 5, 1929 |
| 2,072,730 | Corbett | Mar. 2, 1937 |
| 2,243,567 | Linde | May 27, 1941 |
| 2,330,690 | Dannenberg | Sept. 27, 1943 |
| 2,473,196 | Dannenberg | June 14, 1949 |
| 2,476,071 | Spiro | July 12, 1949 |
| 2,794,096 | Kozacka | May 28, 1957 |

FOREIGN PATENTS

| | | |
|---|---|---|
| 1,085,754 | France | Aug. 4, 1954 |